June 16, 1942. H. B. HOLTHOUSE 2,286,853
HEATER
Filed Dec. 2, 1939 3 Sheets-Sheet 1

Inventor:
Harry B. Holthouse
By: Foorman L. Mueller
Atty.

June 16, 1942.  H. B. HOLTHOUSE  2,286,853
HEATER
Filed Dec. 2, 1939  3 Sheets-Sheet 3

Inventor:
Harry B. Holthouse
By: Foorman L. Mueller
Atty.

Patented June 16, 1942

2,286,853

UNITED STATES PATENT OFFICE 2,286,853

HEATER

Harry B. Holthouse, Chicago, Ill., assignor to Galvin Manufacturing Corporation, Chicago, Ill., a corporation of Illinois Application December 2, 1939, Serial No. 307,340

13 Claims. (Cl. 158—28)

This invention relates to heat generators and in particular to a heating unit for an automobile or the like.

Automobile heating devices generally, utilize the waste heat of the engine, namely the heat from the exhaust and the engine-cooling water. This heat is transferred to the air to be heated by various types of heat exchangers, the air being passed in heat exchange relation with the heat exchanger by means of a suitably driven fan or the like. In these devices the heat obtainable is dependent upon an operation of the engine, and since an engine is not immediately warm upon operation thereof, sufficient time must be allowed after engine starting for the supplying of heat to the exchangers. During times of cold weather, therefore, when the engine is run for only a relatively short time, these heaters are unable to provide any appreciable amount of heat and as a result, the automobile is cold and uncomfortable. This condition is particularly objectionable where the car is used for evening social engagements, for transportation to work each day, for relatively long stops during a routine day of business or shopping, or for similar like uses.

To overcome these disadvantages later car heaters are provided with a burner which provides heat independently of the engine waste heat system, the heat being available for operation immediately upon a starting of the engine. In the presently used heaters of this type, however, the air for combustion is supplied to the burner at a relatively high pressure by utilization of the engine power such as the intake suction, air being drawn into the burner by a suitable connection of the burner air supply duct with a part of the engine intake. This arrangement provides for a large supply of air at a relatively high pressure and consequently provides also for a substantially high rate of air flow through the burner and heat exchanger structure. Thus although much heat is generated by use of the available air supply, the rate of supply negatives an efficient transmission of a large portion of this heat to the radiating elements in the burner heat exchanger. It is to be noted also that the burner will not operate independently of the engine, so that during periods when the car is parked, but when some of its occupants wish to remain therein, it is necessary to keep the car running to supply air to the burner. The operation of the heating device at such times is very expensive and the idling of an engine of a parked car is a hazardous practice.

It is an object of this invention, therefore, to provide for an improved heating unit for automobiles and the like.

It is a further object of this invention to provide for a heating system having a low pressure air supply, a low pressure fuel supply and low pressure combustion, whereby to reduce to a minimum the power required for the operation of the system. Since automobile engines are designed for most efficient operation without consideration of the kind or number of any additional engine adjuncts which might later be connected thereto, it is important that the engine adjuncts do not impair the initial efficiency of the car, by an excessive drain on the car battery or by the utilization of a portion of the manifold air.

It is another object of this invention to provide a heating system for an automobile which is wholly operable independently of the main engine. The electrical power required to operate the heating system is reduced to a minimum, so that the system can be operated from a car battery without seriously affecting its charged condition.

It is a further object of this invention to provide a heat generator having a burner assembly in which the temperature of the fuel mixture is automatically controlled to effect a most advantageous mixing of the fuel and air for combustion. A preheating of the fuel and air mixture provides for a positive starting of the burner and assures a steady even burning of the mixture during all times of operation of the heat generator.

It is yet another object of this invention to provide a heat generator having an elongated combustion chamber which is adapted to transfer heat directly to the air to be heated. Combustion is made to occur actively throughout the length of the combustion chamber so that an expansive heat radiating surface is available for heating purposes, the heat intensity over the entire length of the combustion chamber being substantially uniform.

It is another object of this invention to provide for a heating unit having an elongated combustion chamber in which additional air for combustion is supplied at spaced intervals within the chamber to obtain a complete burning of the fuel and air mixture passing through the chamber, the mixture being introduced into the chamber in a relatively rich form.

It is yet another object of the present invention to provide a heat generator in which the amount of air and fuel supplied for combustion is regulated directly in response to a desired heat demand, by varying the heat output of the generator heating element in accordance with such heat demand. In the heating devices of the prior art the heat supply is varied by a variation only in the rate of flow of the air to be heated, the heat output of the heating element remaining substantially constant so that the temperature of the air delivered to the car is substantially the same, since only its rate of flow has been changed in response to the demand for less heat.

It is a still further object of this invention to provide a fuel system in which a free flow of the fuel therethrough is obtained at all times by the elimination of relatively small orifices. In the prior art, orifices in the fuel system are a constant source of worry because of clogging by carbon formations or by dirt particles distrained in the fuel.

Further objects and advantages of the present invention will become apparent from the following description when taken in connection with the accompanying drawing in which.

Figures 1, 2, 3:
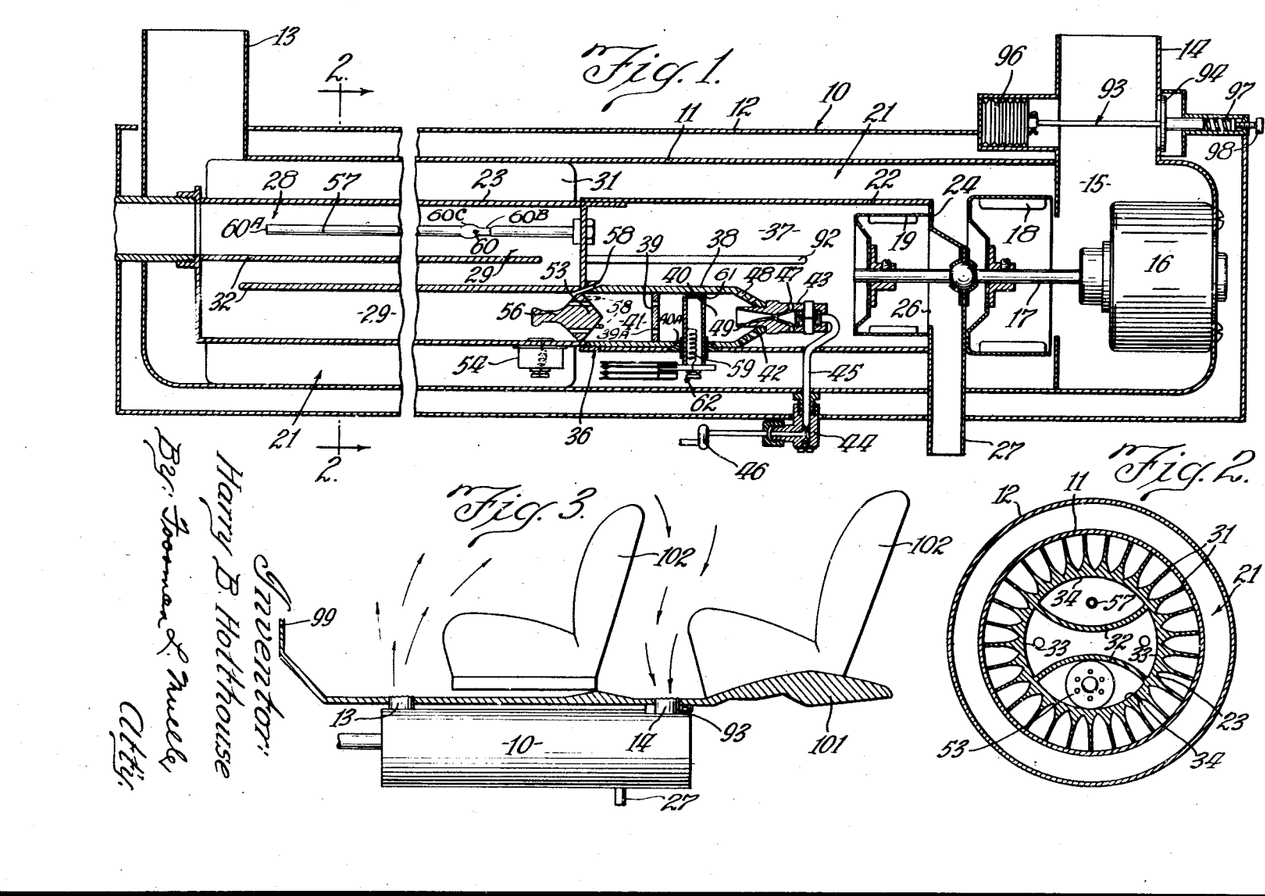
Fig. 1 is a longitudinal sectional view of a preferred embodiment of the invention.
Fig. 2 is a sectional view taken along the line 2—2 of Fig. 1.
Fig. 3 is a diagrammatic illustration of a portion of an automobile showing the path of the air currents therethrough as effected by utilization of a heater of the present invention.

With reference to the drawings, there is shown in Fig. 1 a heat generator 10 including a housing 11 of substantially cylindrical form, having an insulating covering 12, the housing being provided with an outlet 13 at one end and an inlet 14 at the opposite end thereof. The inlet 14 is in communication with a space 15 which houses a motor 16, the motor shaft 17 extending inwardly of the housing 11 and having mounted thereon fans or blowers 18 and 19, to be hereinafter described. The blower 18 is arranged to take air in from the inlet 14 for discharge into a passage 21 which is connected with the outlet 13. The passage 21 is of annular shape and is formed between the housing 11 and inner cylindrical casings 22 and 23, which are in telescopic engagement so that the telescopic assembly is substantially co-extensive with the housing 11. The casing 22 serves as a housing for the blower 19 which is separated from the blower 18 by an end plate 24, which has an opening 26 therein for connecting the fan 19 with a fresh air inlet 27.

The casing 23 forms an outside shell for a combustion chamber 28. Although the casing 23 is relatively short axially, the combustion chamber itself is of elongated construction, the chamber length being obtained by means of connected, axially extending passages 29, three of such passages being shown. As noted in Fig. 1 these passages provide for an elongated combustion chamber by their super-imposed or serpentine formation. The casing 23 is provided with radially extending fins 31 which may be integrally formed therewith. The fins 31 extend into the passage 21 for engagement with the inner surface of the housing 11 (Fig. 2). Since the cylindrical casings 22 and 23 are in telescopic assembly it is apparent that the positioning of the fins 31 within the housing 11 provides for concentricity between the casings and the housing 11, and hence for the annular formation of passage 21. The passages 29 are separated by partition walls 32 of arcuate shape, which provide for the association of a substantially equal portion of the surface of casing 23 with each passage 29. Since the heat intensity in each passage 29 is substantially the same, the transfer of heat from each passage to the casing 23 will be substantially the same. It is seen, therefore, (Fig. 2) that the sum of the peripheral portions 33 is substantially equal to each of the peripheral casing portions 34. There is thus obtained a uniform distribution of heat from the fins 31 to the air passing thereabout through passage 21.

The passages 29 are in functional association with a burner assembly 36 which is located at the mouth of the combustion chamber 28, and is threadedly engaged thereto, the assembly extending outwardly from the chamber 28 so as to be housed within the casing 22, which also encloses an air supply chamber 37. Air is supplied to chamber 37 by blower 19. The assembly 36 includes a tubular housing 38 having a perforated partition 39 therein for a division thereof into a fuel and air mixing chamber 40 and a receiver chamber 41. The chamber 40 is provided with an outwardly tapered end 42, in which is located a fuel injector 43. The amount of fuel admitted into the chamber 40 through the injector 43 is measured by a metering device 44 which is located in the fuel supply line 45, the fuel being delivered therethrough by a suitable pump 46. It is contemplated that the pump 46 be of the usual diaphragm type, electrically operated from the car battery. Since the fuel is delivered at a low pressure, it is to be noted that the fuel from injector 43 is ejected in substantially droplet form rather than in spray form, the metering device 44 being adjusted to control the fuel drops in correspondence with the air admitted into the chamber 40 through ports 47 and 48, which will be hereinafter described. The injector orifice 49, therefore, is of relatively large diameter and in some instances may be of a diameter equal to the diameter of the supply line. A clogging of the orifice by impurities or particles distrained in the fuel is thus substantially eliminated. It is to be noted further that the orifice 49 is far removed from the combustion chamber 28, so that carbon formations thereon are positively eliminated. The injector 43 may also be operated in conjunction with the novel metering device 50 shown in Fig. 6.

Figures 4, 6:
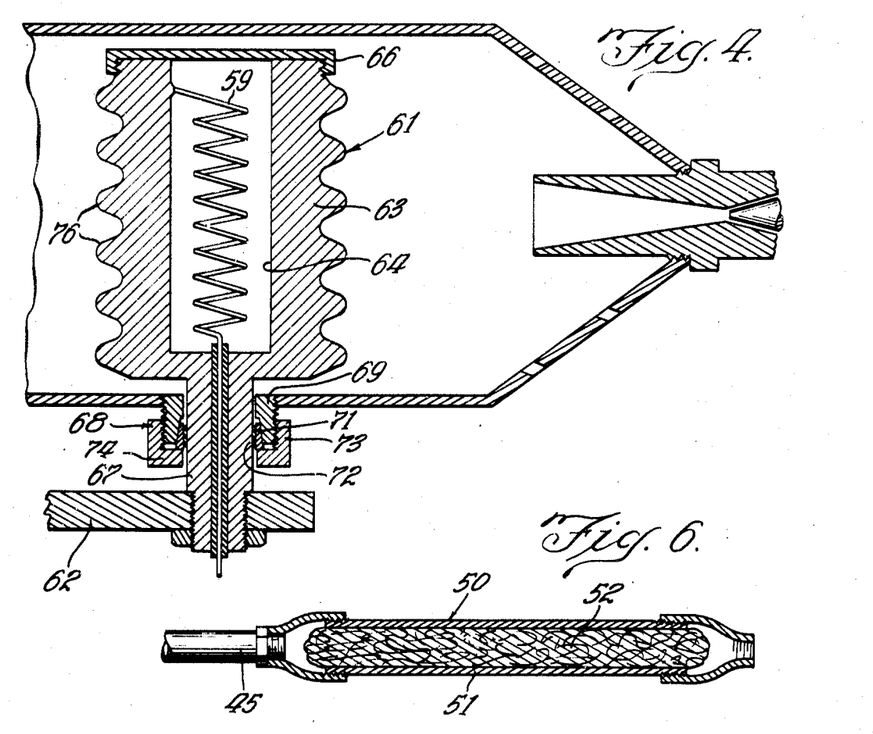
Fig. 4 is an enlarged fragmentary portion of the heat generator showing the mixing chamber and the arrangement of the pre-heating unit therein.
Fig. 6 is a sectional view of a novel fuel metering device.

The device 50 includes a piece of tubing 51 which is completely filled with a wick member or cartridge 52, which may be formed of longitudinally extending fibers. The rate of flow of the fuel through the tubing 51 is thus seen to be a function of the pump delivery head and the capillary action of the cartridge 52, the pressure head of the pump serving to effect an accelerated capillary action. The cartridge 52 absorbs the wave action in the line 45 as set up by the pump 46, so that the droplets at the injector 43 are of exceedingly accurate measurement both as to rate of occurrence and volume. The amount of fuel required for combustion is determined by the relative diameters of the tubing 51 and line 45, and the delivery head of pump 46.

The ports 47, which were above noted, are located in the body portion of the injector 43 and the ports 48 are arranged in the converging sides of the tapered end 42 of chamber 40. The air from ports 47 is first to contact the fuel from injector 43 and acts to disperse or break up the liquid fuel body, before the fuel contacts the air from the ports 48. The ports 48 are adapted to direct the air passing therethrough, into the fuel and air mixture leaving the injector 43, at points which are progressively farther away from the injector 43. The prior breaking up of the fuel by the air from ports 47, provides for more fuel surface being contacted and hence more fuel being intermixed with the air from ports 48, the directioning of the air streams and the consequent resulting turbulence of the fuel and air in the chamber 40 acting to thoroughly mix all portions of the fuel and air.

The fuel mixture from chamber 40 enters the receiver 41 through the perforations in partition 39 which function in part to effect a straight line flow of the mixture entering the receiver or distributor 41 from chamber 40. The receiver 41 acts to restrict the rate of flow of the mixture from chamber 40 sufficiently to effect a substantially uniform distribution of the mixture over the sectional area thereof, whereby the mixture leaving the chamber 41, through the perforations in the ceramic partition 53, will be relatively uniformly distributed over the entire mouth of the combustion chamber 28. The chamber 41 and partitions 39 and 53 thus eliminate any pulsations in the flow of the mixture into the combustion chamber 28, by an elimination of the direct passage of air thereto from the ports 48, the turbulence of the mixture in chamber 40 being dampened in chamber 41 so that passage of the mixture outwardly therefrom through the partition 53 occurs at a substantially uniform rate of flow. The chamber 41 is thus seen to substantially eliminate the passing into the combustion chamber of raw air or mixture portions having widely varying air to fuel ratios and moving with varying rates of flow. Burning of the mixture in the combustion chamber thus proceeds evenly and without any sputtering of the flame. After the start of combustion, the tail projections 56 on the partition 53 become heated sufficiently to aid in the igniting of the mixture entering the combustion chamber from receiver 41.

In the present invention it is contemplated that the air to fuel ratio of the mixture leaving the chamber 40 be relatively rich so that all of the mixture passing into the combustion chamber 28 will not be immediately ignited. A portion of the mixture, therefore, will remain unburned and will travel through the combustion chamber with the burning portions of the mixture. To complete the burning of all portions of the mixture, additional air for combustion is supplied at spaced intervals within the combustion chamber 28 by means of a tubular extension 57 which is connected with the air supply chamber 37. As this additional air is mixed with the unburned mixture portions, the burning within the chamber 28 is given additional impetus by the provision of sufficient air to effect a burning of such unburned mixture portions. The process of combustion in the chamber 28 is thus extended throughout the entire length of the chamber 28 so that the entire peripheral surface of casing 23 radiates heat at a substantially uniform rate.

In addition to the supply of air to the fuel through ports 47 and 48, and tube 57, air may also be supplied to the fuel through ports 58 in the housing 38. Since the air supplied for combustion is at a low pressure, it was found desirable in one commercial embodiment of the invention to increase the area of the air admission ports to supply additional air for efficient combustion. The ports 58 provide this additional air for combustion without an increase in pressure and hence an increase in the power for supplying such air.

It is to be noted that the provision for combustion throughout the length of the combustion chamber is of extreme importance, because of the low pressures at which the subject heating system operates; pressures as low as one-half inch of water having been obtained in one commercial embodiment of the invention. The operation of a system with a pressure as low as this is desirable because it provides for a minimum of power in the provision of air and fuel for the system; this requirement being particularly advantageous in the case of car heating systems in which all of the air and fuel is supplied by electrically driven means. The air supply means, such as the fans 18 and 19, are, therefore, of low capacity, so that the burning of the mixture in chamber 28, unless properly controlled, will effect a complete stoppage of the mixture flow through the chamber, thereby rendering the heating device inoperative. The process of combustion, therefore, must be controlled to maintain a flow of the mixture through the combustion chamber.

The desired flow control is obtained by directioning the air in the tube 57 in the direction of flow of the mixture; the air being discharged from the tube through the end opening 60A and through apertures 60, which are formed in the tube wall. The tube 57 is formed with adjacent flat portions 60B, and 60C, the apertures 60 being positioned in the portion 60B in a manner to direct the air passing therethrough substantially along the sides of the flat portion 60C. The air discharged from the tube 57, acts to accelerate the burning in the direction of the mixture flow, so that the propagation of the burning flame already in the combustion chamber effects an acceleration of the mixtures flowing through the combustion chamber 28. A very efficient burning of the mixture is thus obtained at very low pressures. It is to be noted that since the rate of flow of the mixture in the chamber 28 is low, time is permitted for a substantially complete conduction of the combustion heat through the casing 23 to the fins 31 for transfer to the air flowing through passage 21. The combustion chamber, therefore, serves as an efficient heating element; the power input being very small because of the low operating pressures and the available heat output being very high because of the efficient burning of the fuel and the low rate of flow of the mixture through the combustion chamber.

In further view of the low operating pressures of the subject system, it has been found desirable to heat the fuel and air supplied to the chamber 40 to an optimum temperature which conditions the fuel and air mixture for a substantially positive and rapid burning in the combustion chamber, whereby to eliminate an unsteady flame in the chamber 28. It is essential however, that the mixture be not excessively heated so that combustion will occur in the mixing chamber. It is to be understood that the presently described heating system is not to be limited in its operation and consequent application to the low operating pressure hereinabove defined, this value being relative only to the power available for operating the system. When the available power, therefore, is high the operating pressure can be increased and the pre-heating of the mixture might possibly be entirely eliminated.

The mechanism for pre-heating the fuel mixture in chamber 40 includes a coil 59 having a surrounding shell 61, the coil being located within the chamber 40 and in electrical circuit with a bi-metal switch assembly 62, which is located in the annular passage 21.

The shell 61 (Fig. 4) for coil 59, has a cylindrical body portion 63 having an axially extending bore 64 therein for reception of the coil 59. The coil 59 is enclosed within the bore 64 by a cap 66 which is suitably secured to the body portion 63 at the open end thereof. The cap 66 serves to keep the radiant heat from the coil 59 confined within the bore 64 and further prevents any of the fuel and air mixture in the chamber 40 from directly contacting the coil. The closed end of the portion 63 is provided with a projection 67 which extends through the housing 38 into the annular passage 21. The shell 61 is suitably secured in the housing 38 by a supporting structure designated generally as 68. A nipple 69, which extends about the projection 67, is threadedly secured to the housing 38, and is provided with an internally formed shoulder for engagement with a ring gasket 71 having a tapered cross section. Positioned inwardly of the gasket 71 and about the projection 67 is a mica ring 72, which electrically insulates the shell 61 from the structure 68 and hence from the housing 38. A lock nut 73 is adapted for threaded engagement with the nipple 69 and is formed with an inwardly extending flange portion 74 for engagement with the gasket 71, the wedging of the gasket 71 between the nipple and the lock nut serving to secure the shell 61 in the housing 38 in an obvious manner. It is to be noted that only the mica ring 72 is in contacting engagement with the projection 67, and that a small air gap is formed between the projection 67 and the remaining members of the structure 68, for a purpose to be hereinafter noted.

The switch assembly 62 is secured to the free end of the projection 67 in thermal and electrical relation therewith, so as to be in heat transfer relation with the shell 61, and in electrical connection with the coil 59. In this connection it is to be noted that the temperature of the shell 61 is controlled by the heat from coil 59 and the temperature of the adjacently surrounding space and burner structure, as will be hereinafter described. The heat radiated from the shell 61 by means of the fins 76, thus serves to heat the chamber 40. The temperature of the shell 61 is thus seen to be controlling in the operation of the switch assembly 62 and hence in the providing of a desired temperature in the chamber 40.

Figure 5:
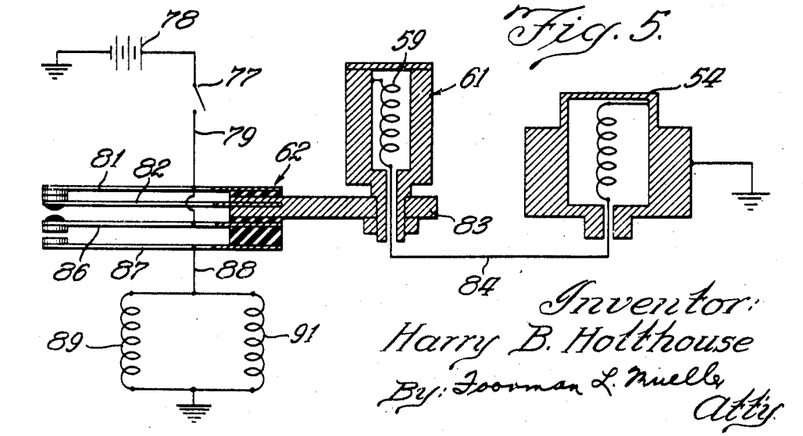
Fig. 5 is an electrical diagram showing the control circuits for the fuel and air supply systems.

With reference to Fig. 5 there is shown an electrical circuit for the coil 59, the igniter 54, fans 18 and 19, and fuel injector 43. When the switch 77 is closed, a current from a suitable source such as a battery 78 is permitted to flow through conductor 79 to normally connected spring contacts 81 and 82 to switch bracket 83 and shell 61, to coil 59 and through conductor 84 and igniter 54 to ground. This flow of current effects an energization of the igniter 54 and pre-heating coil 59. When the shell 61 is heated sufficiently to heat the air initially present in chamber 40 to a temperature which will permit a suitable mixing of the fuel and air to be supplied thereto, the bi-metal spring 82 will move downwardly, as seen in Fig. 5, to force together contacts 86 and 87. The contacts, 82 and 86, however, are not electrically connected because of insulation therebetween.

This movement of the bi-metal spring 82 permits current from the battery 78 to flow through conductor 79, spring contacts 86 and 87 and conductor 88 to coils 89 and 91, which are in electrical association with the injector pump 46, and fans 18 and 19, respectively, the current returning to the battery through the ground. This flow of current effects an energization of the coils 89 and 91 and a consequent operation of the fans 18 and 19, and fuel injector pump 46, whereby to supply air and fuel to the chamber 40. It is thus seen that no fuel and air for burning is supplied to the chamber 40 until the temperature thereof is raised to a predetermined degree commensurate with suitable air and fuel mixing.

During the initial heating of the coil 59 and hence of the shell 61 to provide a desired temperature of the air, in chamber 40, the contacts 81, 82, 86 and 87 will all move downward together, as viewed in Fig. 5; the bi-metal switch 82 moving the contact springs 86 and 87 in response to the temperature increase of shell 61 and the contact spring 81 following switch 82 in response to the initial spring tension set up therein for obtaining normal contact with the switch 82. After combustion has been started, in the manner above described, heat from the combustion chamber is conducted through housing 38, in an obvious manner, for direct radiation to the chambers 40 and 41, and for indirect radiation to the chamber 40 through the shell 61. As was noted above, the structure 68 is electrically insulated but not thermally insulated from the projection 67. Heat in the housing 38 is conducted to the projection 67 through the mica ring 72, and further heat is radiated to the projection 67 through the above defined air space between the projection 67 and the structure 68 which is heated by the housing 38. The heat thus transferred to the projection 67 is conducted through shell 61 for radiation into the chamber 40. During normal operation of the generator 10 the heat thus transferred to the chamber 40 in this manner is sufficient to heat the air and fuel supplied thereto to an optimum temperature which provides for a mixing of the air and fuel to best advantage for combustion purposes. Any unmixed fuel is retained at the bottom of the chamber 40 about the shell 61 and between the partition 39 and chamber end portion 42, to prevent its flowing into the combustion chamber; the lowermost perforation 39A in the partition 39 and the lowermost port 48A in the end portion 42 being spaced a distance above the chamber 40 sufficient to form a well or pan 40A. The unmixed fuel collected in the well 40A is heated by the shell 61 and contacted by the air in the chamber 40 for passage into the combustion chamber 29 in mixture form.

When the temperature of the mixture in chamber 40 has increased beyond the optimum temperature the bi-metal contact spring 82 will move out of contact with the spring 81, the contacts 82, 86 and 87 continuing their downward movement together. The heating coil 59 and the igniter 54 are thus disconnected from the battery 78 since an energization of the coil 59 and igniter 54 is no longer required for a proper maintenance of combustion. A further reduction in the electrical power required to operate the system of the present invention is thus obtained by an elimination of a continuous energization of the coil 59 and igniter 54.

However, should the temperature of the shell 61 drop below that necessary to effect a proper temperature of the mixture in the chamber 40, the bi-metal spring contact 82 will re-engage the contact 81 to permit the current from the battery 78 to flow therethrough for the energization of the coil 59 and igniter 54 in the manner hereinabove explained. If the igniter 54 and pre-heating coil 59 should fail for any reason to raise the temperature in chamber 40 immediately back to the desired operating temperature, the bi-metal spring 82 will break engagement with the contact 86 to open contacts 86 and 87 so as to de-energize coils 89 and 91 which govern the admission of air and fuel to the chamber 40, thus stopping the operation of the heat generator 10.

The fuel and air admitted into the chamber 40 impinges upon the fins 76 of shell 61 (Fig. 4) so as to effect a cooling action on the shell 61. During normal operation of the heat generator this cooling effect is absorbed by the heat transmitted to the chamber 40 from the combustion chamber 28. Thus upon a failure of combustion the shell 61 is suddenly cooled by the concurrent cessation of the heat supplied thereto from the combustion chamber 28 and the cooling thereof by the impingement of fuel and air thereon. In immediate response to this cooling of the shell 61 the bi-metal switch 82 which is in thermal connection therewith, functions to de-energize coils 89 and 91 by breaking engagement with spring contact 86, thus cutting off the air and fuel supplied for combustion. The accumulation of raw fuel in the combustion chamber is thus eliminated whereby to preclude any possible explosion upon a later ignition thereof.

Since the air supplied to the chamber 37 by the fan 19 (Fig. 1) is fresh air, there will be a relatively large temperature differential between the temperature of the air coming in through the inlet 27 and the optimum temperature required in chamber 40 for a proper conditioning of the fuel and air supplied thereto. To minimize this temperature differential, there are provided heat transfer elements such as 92 which are in heat conductive relation with the combustion chamber 28 and which extend into the air supply chamber 37 so as to heat the air therein. It is seen, therefore, that the coil 59 operates alone at the inception of operation of the generator 10 to heat only the initial air obtaining in chamber 40, and that after combustion has started the heat from combustion is utilized to heat the air in the chamber 37, and also the fuel and air mixture in chamber 40, in the manner and for the purpose hereinabove described. It is to be understood, however, that this use of the combustion heat is limited to an amount less than that which will effect a temperature rise of the mixture in chamber 40 sufficient to create combustion in chamber 40.

In car heating systems generally, the heat output is regulated by varying the flow of air to be heated about the heating elements, or by a stopping and starting of the heating system. In either case the temperature in the car is frequently and suddenly changed with consequent discomfort to the passengers therein. To maintain the air within the car at a substantially uniform temperature there is provided, at the recirculated air inlet 14 of the heat generator 10, a temperature control assembly which is designated generally as 93. The assembly 93 includes a fresh air inlet valve 94 which is actuated by a sylphon type valve 96, the valve 96 being responsive to the temperature of the recirculated air at the inlet 14. Thus when the temperature of the recirculated air reaches a predetermined high value the valve 96 will operate to open the valve 94 so as to permit fresh air to be mixed with the recirculated air entering the heat generator through the inlet 14. The valve 94 will remain open until the air at the inlet 14 has been cooled sufficiently to permit the spring 97 to take control away from valve 96 so as to return the valve 94 to its closed position. The screw 98 may be adjusted to regulate the tension in the spring 97 to vary the temperature at which the valve 94 will be operated by the valve 96. There is thus provided in a car heating system an automatic temperature control means for maintaining a substantially uniform temperature in the car. It is to be noted that the fresh air is passed about the combustion chamber 28 with the recirculated air. Fresh air is thus admitted into the car with the heated air with the complete elimination of sudden drafts of cold air.

A typical installation of the above-described heat generator as applied to an automobile is shown in Fig. 3, in which there is diagrammatically illustrated a dash 99, a floor 101, and seats 102. The heater 10 is mounted below the floor with the outlet 13 arranged before the front seat and the inlet 14 arranged before the back seat, the temperature control assembly 93 being located as shown so as to be readily accessible for adjustment purposes. With the heater thus arranged, the air flow between the outlet 13 and inlet 14 is substantially as indicated by the arrows so that a complete circulation of air within the car is obtained. Cold spots within the car body are thus practically eliminated and since the temperature of the air is automatically controlled by the temperature control assembly 93 a maximum of comfort is assured to all of the car passengers.

Figures 7, 8:
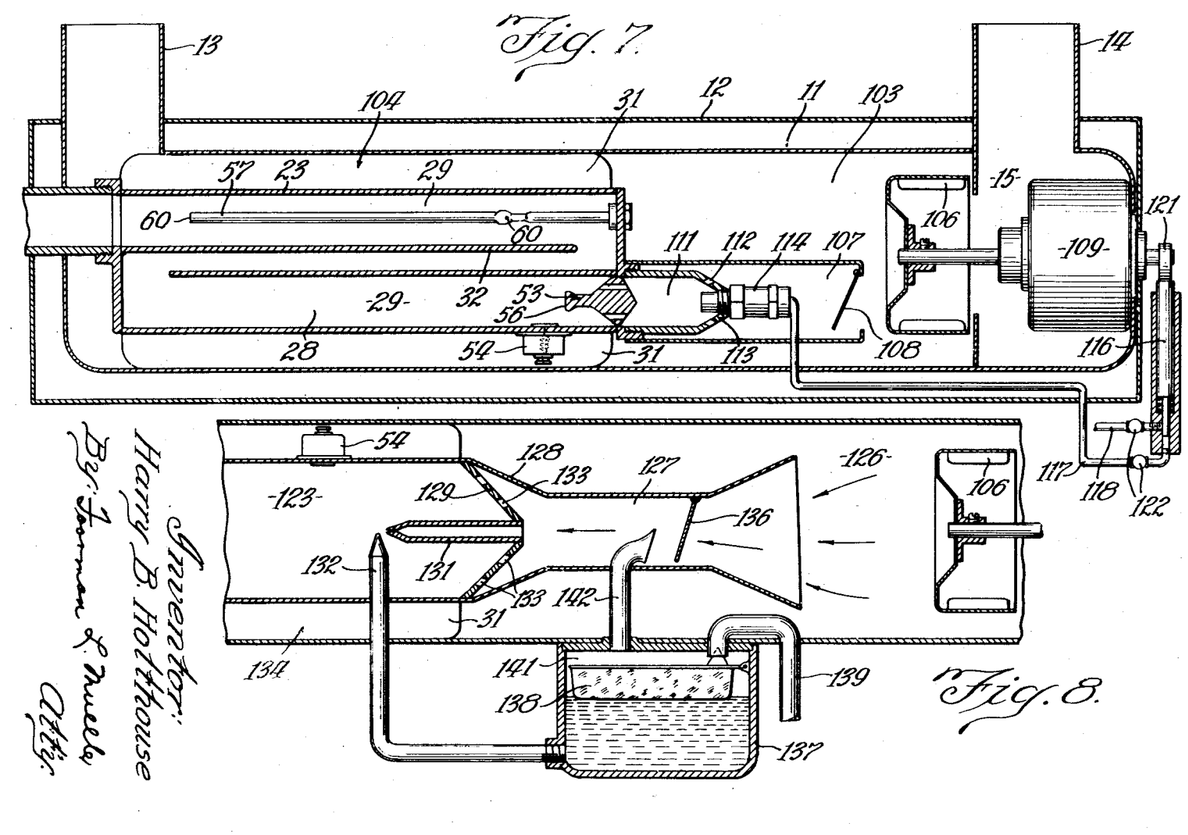
Fig. 7 is a modified form of the invention.
Fig. 8 is a further modification of the invention.

The modified forms of the invention shown in Figs. 7 and 8 are similar in some respects to the preferred embodiment of Fig. 1 and similar reference numbers, therefore, are used to designate similar parts. With reference to Fig. 7 the outlet 13 and inlet 14, which are located at opposite ends of the housing 11, are in air flow communication through space 15, air chamber 103 and annular passage 104, the passage 104 being formed between the combustion casing 23 and the housing 11. The flow of air through the outlet 13 and inlet 14 is obtained by a fan 106 which supplies air to the chamber 103 for admission into the passage 104 and compartment 107.

The compartment 107 which is located in chamber 103 is of substantially tubular form, one end thereof being secured about the mouth of the combustion chamber 28 and the opposite end thereof being provided with a flap valve 108. The extent of opening of the valve 108 is directly proportional to the velocity of the air discharged by the fan 106, which is of variable speed type and operated by a motor 109. It is thus seen that the opening of the valve 108 is directly proportional to the speed of the fan 106 so that as the speed of the fan is increased, a greater quantity of air is delivered to the compartment 107 by a greater opening of the valve 108. It is to be noted also that the valve 108 operates to prevent a back flow of air from the compartment 107 into the chamber 103, so that exhaust fumes from a back fire in the combustion chamber will not be passed into the recirculated air flow for discharge through outlet 13.

The air from the compartment 107 is admitted to a fuel and air mixing chamber 111 through ports 112 which are arranged in the tapered end 113 thereof in a manner to effect an intimate mixing of the air with the fuel supplied to the chamber from an injector 114. The injector 114 is fitted substantially centrally of the end portion 113, so that the air from ports 112 is thoroughly intermixed with the fuel by contact therewith at points progressively farther away from the injector location. Fuel for the injector is supplied by a pump 116 through the pump discharge line 117, the inlet line 118 being preferably connected to a source of supply such as the gasoline tank of an automobile. The pump is operated by a motor 109 through a suitable cam mechanism 121, the metering of the fuel being accomplished by suitable valves 122 in the pipe lines 117 and 118.

Since the air supplied to the compartment 107 is recirculated air from the inlet 14 and hence air at a relatively warm temperature, and since the pump 116, is regulated, in this embodiment of the invention, to provide a pressure of about twenty pounds per square inch at the injector 114, preheating of the mixture in chamber 111 is unnecessary, so that the fuel and air mixture is passed directly into the combustion chamber 28 through the ceramic partition 53, for ignition by the igniter 54, which is in constant operation. It is contemplated that the mixture in chamber 111 be relatively rich so that all of the mixture passed into the combustion chamber 28 is not immediately ignited by the igniter 54. However, to assure a complete burning of all of the fuel admitted to the combustion chamber, there is provided a tubular extension 57 from the air chamber 103, this extension having been hereinabove described. It is to be noted, however, that although the relatively rich mixture setting is predetermined upon a substantially full heat capacity of the generator 10, that this rich mixture will obtain for all changes in the quantity of fuel and air supplied to the chamber 111 as effected by the variation in the speed of the fan 106, in a manner now to be described.

The speed of the motor 109 is manually controlled by a suitable rheostat switch control (not shown) so that when the heat demand is low, the motor may be operated at a relatively slow speed. When the speed of the motor is decreased, less air is supplied to the chamber 103 and hence about the fins 31 in passage 104, and less air is also supplied to the compartment 107 for consequent combustion in chamber 28. Since the pump 116 is operated by the motor 109 the amount of fuel injected into the chamber 111 is also correspondingly decreased in an obvious manner. Thus a decrease in the speed of the motor 109 and hence of the fan 106 reduces not only the volume of air discharged from the outlet 13, but also reduces the amount of heat which can be radiated from the fins 31 by reducing the amount of the fuel and air to be burned in the combustion chamber 28. There is thus provided a wide variation in the heat output of the generator 10, whereby the temperature differential in the space to be heated is substantially eliminated by a corresponding control of the heat generated in the combustion chamber and the volume of air in heat transfer relation therewith. The heat supply, therefore, can be regulated to closely approximate the heat demand to maintain a substantially even temperature in the space to be heated.

In Fig. 8 the combustion chamber 123 is provided with a single cylindrical passage so that the burning of the mixture therein proceeds directly therethrough instead of through a series of passages 29 such as were described and illustrated in connection with Figs. 1 and 7. The air for combustion is supplied by a blower 106 of variable speed type, the blower operating to discharge air into chamber 126. Located in the chamber 126 and in the line of air flow from the blower 106, is a substantially cylindrical air passage 127 which is adapted to by-pass a portion of the air discharged from the blower into the combustion chamber 123. The discharge end 128 of the passage 127 is provided with an inwardly converging plate 129, the center portion of which has an air nozzle 131 disposed therein. The air from the nozzle 131 is directed over a bleeder valve 132 so as to bleed fuel therefrom in a well-known manner, the plate 129 being formed with ports 133 for directing the air from the passage 127 into intimate contact with the fuel so bled from valve 132. The resulting mixture is ignited by the coil 54, which is in continuous operation, the heat of combustion being conducted by the fins 31 into the passage 134 for transfer to the air passing therethrough from the chamber 126. The air thus heated is discharged through an outlet such as 13 (Fig. 7), the fan 106 being arranged to supply chamber 126 with air from a recirculated air inlet such as 14.

The quantity of air supplied for combustion is controlled by a flap valve 136 which is adapted to close the passage 127, the opening of the valve being directly proportional to the velocity of the air discharged by the fan 106. Thus as was previously described, in connection with the flap valve 108 of Fig. 7, an increase in the speed of the fan 106 will effect a wider opening of the valve 136 and hence a greater supply of air through the nozzle 131 and ports 133 for combustion purposes.

The amount of fuel available for combustion is also varied directly with the speed of the fan 106. The bleeder valve 132 is connected to a carburetor bowl 137, the level of fuel in which is controlled by a float valve 138, the supply line 139 being connected to a fuel tank such as a gasoline tank on an automobile. The space 141 above the fuel level in the bowl is connected by a pipe 142 to the air passage 127 so that the air in the space 141 will vary with the air pressure in the passage 127, and hence with the pressure acting to force air through the nozzle 131. It is thus seen that as the air flow in the passage 127 is decreased by a decrease in the speed of the fan 106, the velocity of the air through the nozzle will be correspondingly decreased so that less fuel will be bled from the valve 132. Since the pressure in the space 141 is correspondingly relieved through the pipe 142, the pressure head acting to force fuel through the valve 132 will also be decreased so as to effect a further decrease in the fuel being bled from valve 132.

When the speed of the fan 106 is increased, the velocity of the air through the nozzle and pressure of the air in the space 141 will be correspondingly increased so that the fuel supplied for combustion will be increased by both the increased bleeding action of the air nozzle and the increased pressure head in the space 141 serving to force fuel through the valve 132. It is apparent, therefore, that the amount of fuel for combustion is controlled by both the velocity of the air through the nozzle and the pressure of the air in space 141. The heat supply is thus directly controlled by the speed of fan 106, the air discharged by the fan serving to effect a corresponding regulation in the amount of fuel and air supplied for combustion, and the amount of heated air supplied for heating purposes.

The subject invention, therefore, provides for an improved heating device which is operated at very low pressures to provide for an efficient heating of spaces having only a small source of available power associated therewith. There is also provided in an automobile heating device means for automatically controlling the temperature conditions existing in the automobile so that a large temperature differential in the car during operation of the heating device is substantially eliminated. An additional feature is found in the provision of means for controlling the heat output of the heat generator in direct accordance with the heat demand by varying the heat output over a wide range of available heat capacities.

It is to be understood that although the subject invention has been illustrated and described with specific reference to an automobile, that it is not to be so limited since the capacity of the system is dependent only upon the available power for operating the system. With increased pressures of both air and fuel, the heat output of the generator of the present invention may be increased sufficiently to provide heat for garages, small stores, filling stations and the like.

It is to be understood further that only preferred embodiments of the present invention have been illustrated and described herein and that modifications and alterations thereof may be made within the full intended scope of the invention as defined by the appended claims.

I claim:

1. In a heat generator having electrical fuel and air supply means, the combination of a combustion chamber and a fuel and air mixing chamber, a heat exchanger in said mixing chamber for heating the air and fuel to a predetermined optimum mixing temperature, arranged substantially completely across the mixing chamber and in the path of the air and fuel flow in such chamber, said heat exchanger being thermally connected with said combustion chamber, electrical means for heating said heat exchanger, an energizing circuit for said electrical heating and air and fuel supply means, and thermostatic means in said energizing circuit for controlling the operation of said electrical heating means in response to the temperature conditions of said heat exchanger, said thermostatic means being arranged to energize said air and fuel supply means when the heat exchanger is at a predetermined temperature and to de-energize the electrical heating means when the temperature of the heat exchanger has been increased above said predetermined temperature.

2. In a heat generator of internal combustion type, the combination of an air supply chamber, a combustion chamber having an inlet, an air and fuel conditioning unit having a fuel and air mixing chamber therein, said unit having an open end portion and a closed end portion, means supporting said unit at said combustion chamber inlet so that said open end portion is in communication with said inlet and the closed end portion extends into said air supply chamber, means for supplying fuel to said mixing chamber including a fuel discharge unit mounted on said conditioning unit at said closed end portion, said conditioning unit having apertures formed therein about the mounting for said discharge unit for admitting air from said air supply chamber into said mixing chamber, and means for heating said mixing chamber to condition said fuel for mixing with said air.

3. In a heater of internal combustion type including an air supply chamber and a heat generating unit having an inlet at one end, the combination of a fuel conditioning unit closed at one end and having an air and fuel mixing chamber therein at said one end, means for supporting the other end of said conditioning unit at said inlet but with said one closed end extending into said air supply chamber, means for supplying fuel to said mixing chamber, said fuel conditioning unit having apertures therein at said closed end for admitting air from said air supply chamber into said mixing chamber, means for heating said mixing chamber to condition said fuel and said air therein for mixing together, and means in thermal connection with said heat generating unit extending into said air supply chamber to heat the air therein, said latter means cooperating with said heating means in maintaining a heated mixing chamber.

4. In a heat generator of internal combustion type, the combination of a combustion chamber having an inlet, an air and fuel conditioning unit having an outlet at one end and being closed at the opposite end thereof, said outlet being in fluid communication with said combustion chamber inlet, means for supplying fuel to said conditioning unit at said closed end, means for supplying air to said conditioning unit for mixing therein with said fuel, electrical heating means in said conditioning unit for heating the air and fuel supplied thereto to prepare said fuel for mixing together with said air, an energizing circuit for said electrical heating means, and thermostatic means in said energizing circuit for operating the same in response to the temperature of said heating means.

5. A heater system of internal combustion type for heating space in a mobile craft utilizing the battery of said mobile craft but operating entirely independently of the motive power for said craft, said heater system having a combustion chamber, an air and fuel mixing portion operatively associated with said combustion chamber to prepare a combustible mixture for burning therein, an electrically operated fan for supplying air to said mixing portion, fuel supply means including a fuel tank and an electrically operated pump for discharging fuel from said fuel tank into said mixing portion, an electrical heating unit arranged in said mixing portion in contact with the air and fuel admitted thereto to condition the fuel for mixing together with said air, an energizing circuit for said heating means, thermal means in said circuit responsive in operation to said heating means to control the energization of the same, and electrically operated means for circulating air in heat exchange relation with said combustion chamber to heat said circulating air, and said electrically operated means projecting said heated air into said passenger compartment, with said battery producing all of the power for operating all of said defined electrical means.

6. In a heater of internal combustion type, the combination of a combustion chamber having an inlet at one end thereof, means providing a combustible mixture for burning in said combustion chamber including an air and fuel conditioning unit open at one end and closed at the other end thereof, said open end being in fluid communication with said combustion chamber inlet, means for supplying fuel to said conditioning unit including a fuel nozzle mounted at said closed end, means supplying air to said conditioning unit for mixing with said fuel at said nozzle, means in said conditioning unit for heating the air and fuel supplied thereto to prepare said fuel for a more thorough mixing with said air, and means restricting the free flow of said mixture through the open end of said conditioning unit to provide for a substantially uniform dispersion of said fuel in all parts of said combustible mixture, at said combustion chamber inlet.

7. A unit heater of internal combustion type for heating a space in a mobile craft having an engine and a battery therefor, said heater having a combustion chamber with an inlet at one end thereof, an air and fuel conditioning unit having an outlet fluid connected with said combustion chamber inlet, a fuel delivery means on said conditioning unit, a fuel supply, an electrical pump for pumping fuel from said fuel supply into said conditioning unit through said fuel delivery means, an electrical fan for supplying air to said conditioning unit, means for mixing a portion of said supply air with the fuel passing through said fuel delivery means, means admitting another portion of said air into said conditioning unit in contact with the mixture from said fuel delivery means, an electrical heating unit in said conditioning unit for heating said air and fuel mixture to prepare said fuel for further mixing with said air, means restricting the free flow of said mixture through said conditioning unit outlet to provide for a substantially complete intermingling of all parts of said fuel mixture, means for progressively admitting additional portions of said supply air into said combustion chamber at spaced intervals therein, said latter means providing for a progressive burning of said mixture in said combustion chamber so that heat is substantially uniformly radiated therefrom over its entire length, and an electrical fan for circulating air in heat exchange relation with said combustion chamber to heat the same and projecting said heated air into said space, with all of said electrical means being operated from said battery to provide for an operation of said heater entirely independently of said mobile craft engine.

8. A heater including in combination an air and fuel mixing unit, electrical means for supplying air and fuel to said unit, electrical means in said unit for heating the same to a predetermined temperature for mixing said air and fuel, said heating means having a portion extending outwardly from said unit, and thermostatic means including a plurality of switch portions mounted on said extending portion and responsive to the temperature condition of said heating means, one of said switch portions being arranged to control the operation of said heating means and the other of said switch portions being arranged to control the operation of said electrical air and fuel supply means.

9. In a heater of internal combustion type for heating a space in a mobile craft having motive power with a battery connected therewith, the combination of a fuel supply, an air and fuel mixing portion, a combustion chamber in fluid-flow relation with said portion, electrically operated air moving means supplying air to said portion, electrically operated fuel moving means for moving fuel from said fuel supply to said portion at a point adjacent the air supply for contact with the air, electrical heating means for heating the air and fuel in said portion to condition the same prior to passage to the combustion chamber, said electrically operated air moving means also circulating air from said mobile craft space in a heat exchange relation with said combustion chamber, with said battery producing the power for all of said defined electrical means to provide for the operation of said heater independently of the operation of the motive power for said mobile craft.

10. In a heating device having a combustion chamber and electrically operated means for removing heat from about said combustion chamber, the combination of an air and fuel mixing chamber operatively associated with said combustion chamber and in heat exchange relation therewith, a circuit for said heat removing means, electrical means for heating said mixing chamber to condition the fuel therein for mixing together with said air, a circuit for said heating means, and thermal means responsive in operation to the temperature of said heating means and common to said two circuits, said thermal means being arranged to alternately control the energization of said electrical heating means and heat removing means so that any exchange of heat from said mixing chamber to said combustion chamber is reduced concurrently with the energization of said heating means.

11. In a heater of internal combustion type for heating space on a mobile craft having an engine with a battery, the combination of an air and fuel mixing chamber in fluid flow relation with a combustion chamber, an electrically operated fan for supplying air to said mixing chamber, a fuel supply system including a tank and an electrically operated pump for pumping fuel from said tank into said mixing chamber adjacent the air supplied thereto, an electrical heating unit in said mixing chamber for heating the air and fuel as it passes therethrough into said combustion chamber to condition the fuel for mixing together with said air, and electrically operated means for circulating air from said space in a heat exchange relation with said combustion chamber, with said battery producing all of the power for all of said defined electrical means to provide for the operation of said heater independently of the operation of the engine for said mobile craft.

12. In heater apparatus of internal combustion type, the combination of a combustion chamber and an air supply chamber, an air and fuel conditioning unit fluid-connected with said combustion chamber, with said conditioning unit having an air and fuel mixing portion within said air supply chamber to receive air therefrom, means for supplying fuel to said air and fuel mixing portion, with said fuel being admitted into said mixing portion adjacent the air supplied thereto from said chamber, and means for heating said mixing portion to condition the fuel therein for mixing together with said air.

13. In apparatus for heating a space in a mobile craft having a motive power with a battery connected therewith, said apparatus having a combustion portion, the combination of means preparing a liquid fuel for burning in said combustion portion including an air and fuel mixing portion with air and fuel being fed therein adjacent one another, electrically operated air moving means supplying air to said mixing portion, a fuel supply, electrically operated fuel moving means for moving fuel from said fuel supply into said mixing portion, with the air in said mixing portion being circulated in contact with said fuel for mixing therewith, electrical means for heating the air and fuel in said mixing portion to condition the fuel for mixing together with said air, an air and fuel receiver portion fluid connecting said mixing and combustion portions, and wherein the conditioned fuel is dispersed substantially uniformly throughout the combustible mixture, said electrically operated air moving means also circulating air from said mobile craft space in a heat exchange relation with said combustion portion, with said battery producing the power for all of said defined electrical means to provide for the operation of said heater independently of the operation of the motive power for said mobile craft.

HARRY B. HOLTHOUSE.